United States Patent [19]

Thomas

[11] 4,040,497
[45] Aug. 9, 1977

[54] TRACTOR

[75] Inventor: Harold D. Thomas, Cumming, Ga.

[73] Assignee: Tri Tractor Manufacturing Co., Inc., Cummings, Ga.

[21] Appl. No.: 603,742

[22] Filed: Aug. 11, 1975

[51] Int. Cl.$^2$ ............................................. B60K 17/28
[52] U.S. Cl. .................................. 180/53 R; 172/297
[58] Field of Search ............... 180/53 R, 66 R, 88; 172/297, 306, 307, 464, 478, 491, 506, 781, 790, 795

[56] References Cited

U.S. PATENT DOCUMENTS

| | | | |
|---|---|---|---|
| 2,624,962 | 1/1953 | Evans | 172/795 X |
| 2,651,179 | 9/1953 | Blood | 172/297 X |
| 2,722,988 | 11/1955 | Kuhary et al. | 180/75 |
| 2,751,028 | 6/1956 | Laughlin | 180/53 R X |
| 2,764,925 | 10/1956 | Kalla et al. | 172/297 X |
| 2,972,850 | 2/1961 | Ariens et al. | 180/53 R X |
| 3,198,276 | 8/1965 | Gordon | 180/53 R X |

Primary Examiner—Joseph F. Peters, Jr.
Assistant Examiner—Terrance L. Siemens

[57] ABSTRACT

The tractor frame and chassis includes a recessed front portion which will accommodate an implement such as a mower attachment over which the tractor is driven for attachment and detachment of the implement. An implement frame on the front is raised and lowered by means of an electric motor and pivoted frame members. An internal combustion engine mounted on the rear of the tractor drives large rear wheels mounted on individual off-set axles extending from an individual axle housing which is driven from a center transmission. A power take-off from the engine drives a belt which extends forwardly around idler pulleys having tension adjustment thereon. The engine drives a hydraulic pump which operates a hydraulic motor and transmission arrangement mounted on the chassis frame generally beneath the seat of the tractor. This provides stability and permits the use of rear mounted implements such as plows as well as front mounted implements such as plows or mowers.

12 Claims, 8 Drawing Figures

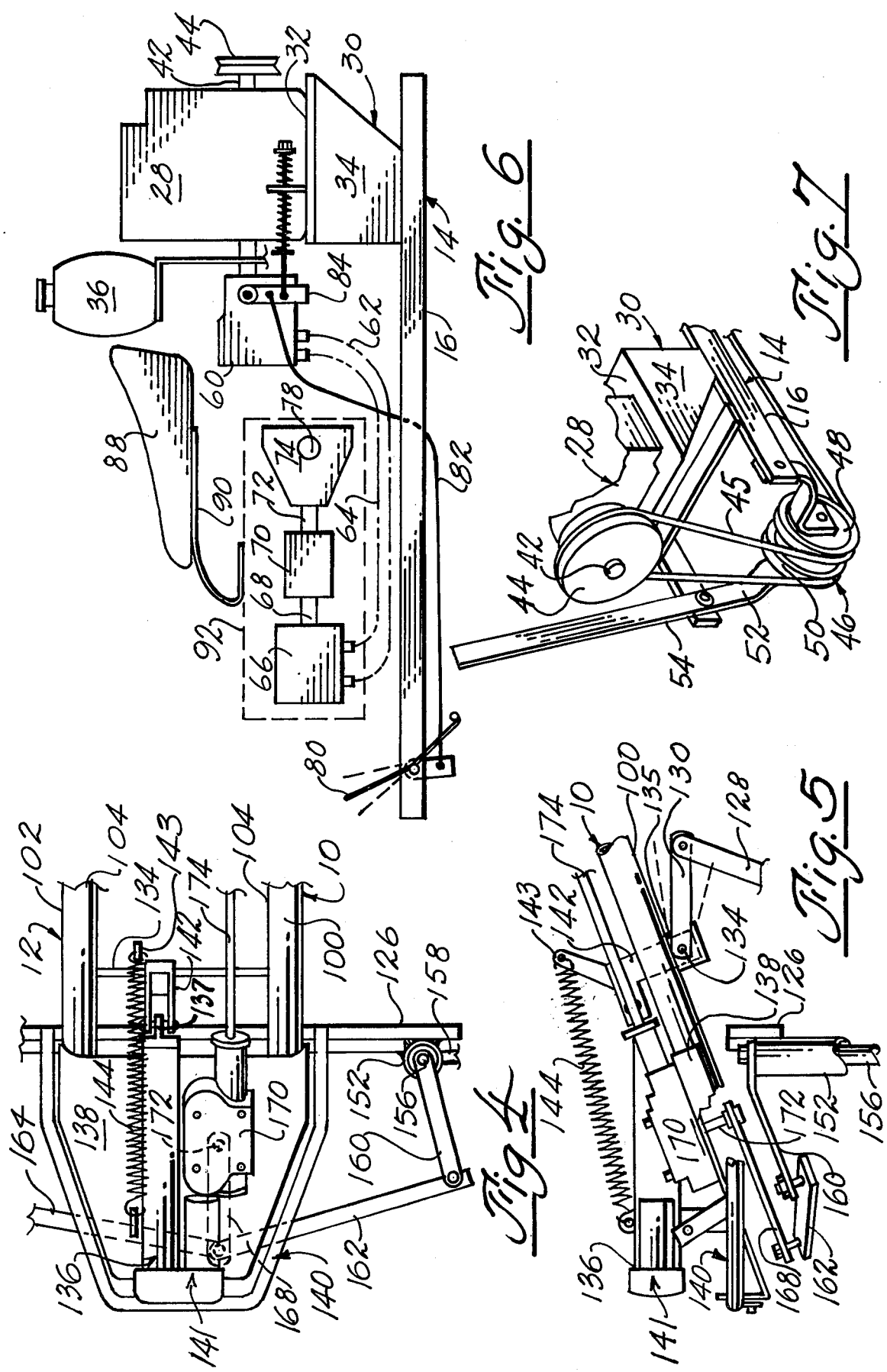

TRACTOR

BACKGROUND OF THE INVENTION

1. Field of the Invention

Land vehicles, especially tractors having rear mounted internal combustion engines and front mounted implements beneath the front frame. Optional front and rear mounted implement holders adjustably mounted on a tractor frame.

2. Description of the Prior Art

Farm and utility tractors having large front mounted engines and rearwardly mounted implements are quite common. The primary factor being considered with respect to the present tractor is a matter of the cost and the ultimate purpose of the tractor. Many gardners and small farmers require more than a simple hand-operated or small riding tractor. The larger farm tractors are too expensive to purchase and maintain. There is also some amount of danger in the operation of a tractor having rearwardly mounted cultivators and implements because of the tendency to turn over about the rear wheels. Thus, for purposes of present consideration the prior art tractors are considered either too small and underpowered and simple and the larger more powerful tractors are too large, powerful and expensive. In order to achieve the different things which are desired in a small farm or utility tractor such as control of the implements, sufficient power to the rear wheels, visibility in the direction of movement as well as in observing the implement work being done, ease of handling and other factors are all found in the present tractor at a price for construction much less than tractors with comparable features.

SUMMARY OF THE INVENTION

The tractor frame, chassis, engine, rear wheels, front wheels, steering and seat are so arranged as to provide a front mounted implement with a rear power take-off and simple hydraulic controls.

An object of this invention resides in the particular construction of the tractor frame and front implement support means whereby an implement may be detachably supported beneath the front frame and easily dropped for removal or driven on top of for attachment.

An additional object of this invention resides in the arrangement of the frame, motor, hydraulic pump, hydraulic motor, and transmission drive for the rear wheels of the tractor.

Still another object of the present invention resides in the power take-off arrangement for the front mounted attachment.

An additional object of this invention is found in the arrangment of the front portion of the chassis or frame in combination with the front mounted implement holding means including pivoted members operated from a simple hydraulic cylinder.

An additional object of this invention is found in the drive arrangment for the large rear wheels which include a drop axle for each wheel driven from a transmission.

The combination and arrangement of the location of the frame, the front portion of the frame which supports a detachable implement, the small front wheels, larger rear wheels, rear mounted engine, a seat in front of the engine with steering wheel in front of the seat, a hydraulic motor transmission, differential arrangement substantially beneath the seat, hydraulic pump beneath the transmission and the motor all provide an arrangement which is simple and dependable.

Other and further objects and advantages of this invention will become apparent upon reading the following description of a preferred embodiment taken in conjunction with the accompanying drawings.

BRIEF DESCRIPTION OF THE DRAWINGS

FIG. 4 is a top plan view of the front end of the tractor frame.

FIG. 5 is a side elevation view of the front end shown in FIG. 4.

FIG. 6 is a side elevation view of the rear of the tractor frame.

FIG. 7 is a perspective view of the power take-off and belt tensioning device.

DESCRIPTION OF A PREFERRED EMBODIMENT

Figure 1:
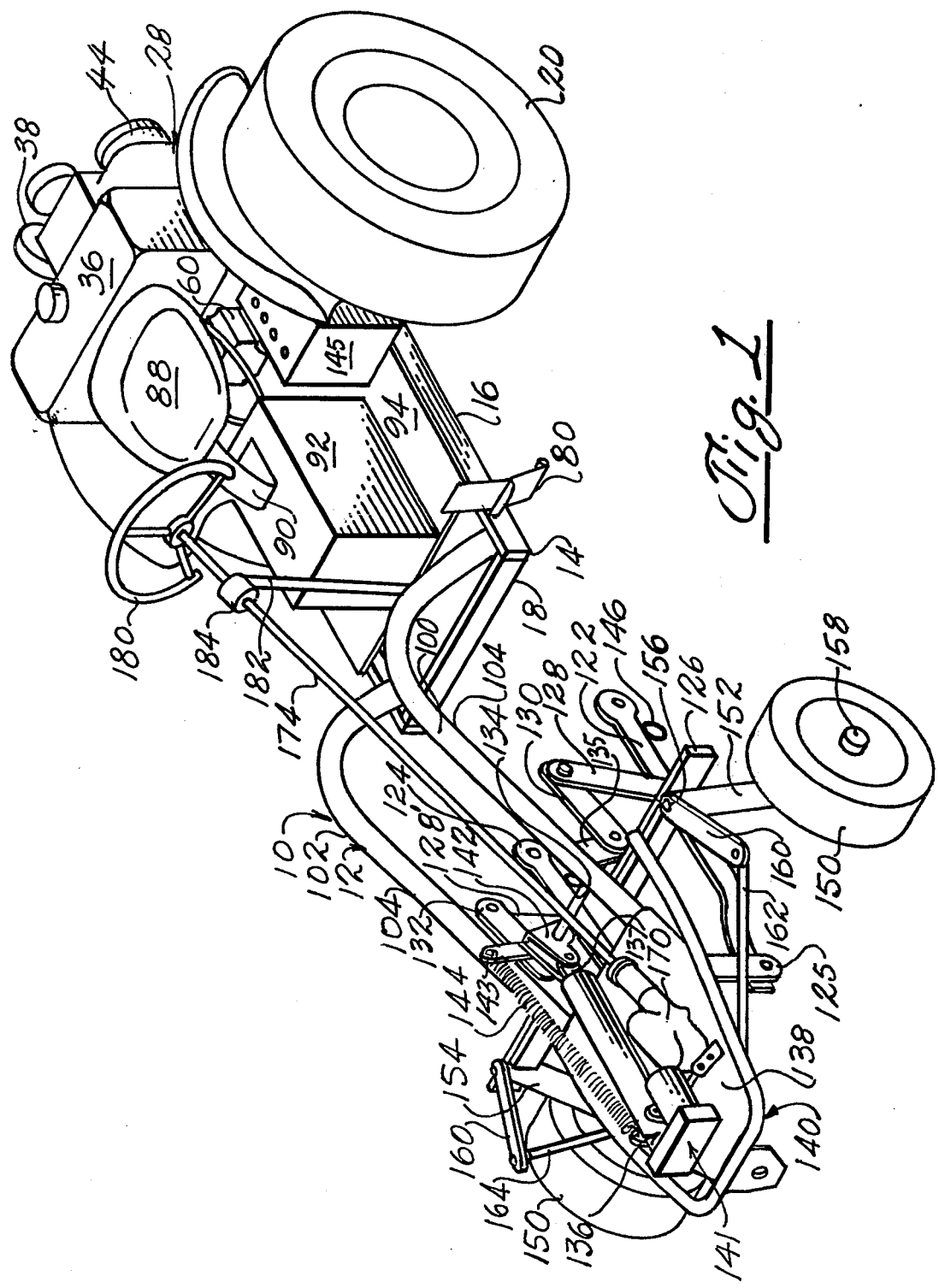
FIG. 1 is a perspective view of the tractor constructed in accordance with the present invention.
Figure 2:
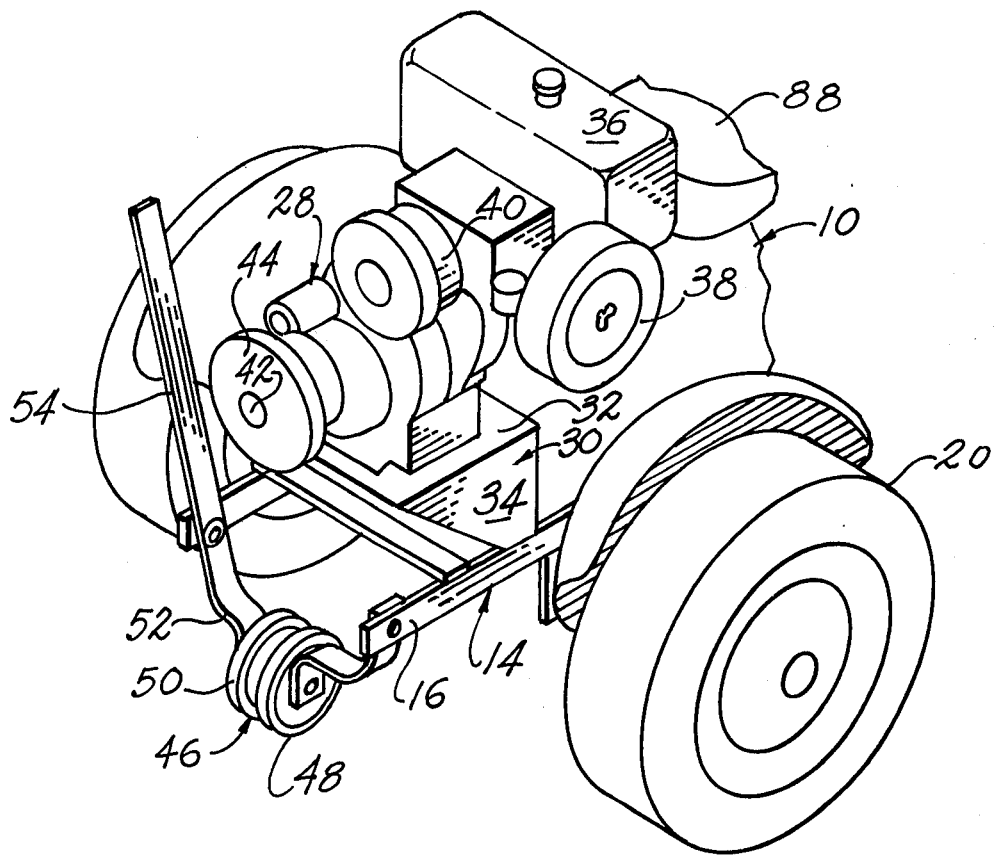
FIG. 2 is a perspective view of the rear of the tractor looking from the rear toward the front.
Figure 8:
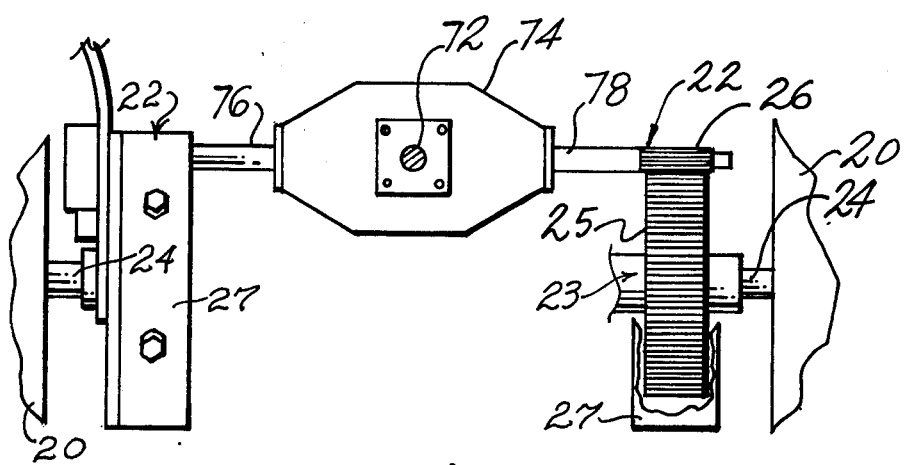
FIG. 8 is a rear elevation view of the rear axle arrangement with parts omitted.

The tractor is designated generally and overall by reference numeral 10 and comprises a tractor frame or chassis 12 which has a rear rectangular portion 14 comprising horizontal frame members 16 and transverse frame members 18. A pair of large rubber-tired rear wheels 20 on opposite sides of the frame 14 are carried by respective individual drop axle drive assembly 22 each comprising an axle support 23 supporting a short axle shaft 24 which is attached to the center bearing of each wheel 20. Shaft 24 has a large gear 25 attached thereto driven from a small pinion 26 inside a case or housing 27.

A large powerful internal combustion engine designated generally by reference numeral 28 is mounted and bolted on a motor support 30 comprising a horizontal motor support plate 32 and vertical support members 34 welded to the rearward portion of the side frame members 16. Engine 28 has the usual components such as gas tank 36, air filter 38, and housing 40 from which extends a power take-off shaft 42 having a double power take-off pulley 44 thereon. A double take-off pulley is provided with a continuous drive belt 45 which extends across the belt tensioning device 46 comprising a pair of opposed pulleys 48, 50 having the belt 45 extending thereabout. Both pulleys 48, 50 are mounted on a pivoted bracket 52 operated by a lever 54.

As seen in FIG. 6, the motor or engine 28 drives a hydraulic pump 60 which through a pair of lines 62, 64 operates a hydraulic motor 66 having an output shaft 68 driving a transmission 70 having an output shaft 72 driving a rear end differential 74. The differential 72 has a pair of upper axle drive shafts 76, 78 extending therefrom and driving each pinion 26 of the respective drop frame drive assembly 22 for each of the wheels 20.

A foot pedal control 80 is connected by a cable 82 to a pump control member 84 on pump 60 providing the control for the hydraulic motor 66 and therefore for the drive of the rear wheel 20.

A spring mounted tractor seat 88 mounted on a leaf spring 90 is attached to a box 92 which rests on a platform 94 mounted across the frame member 16.

Figure 3:
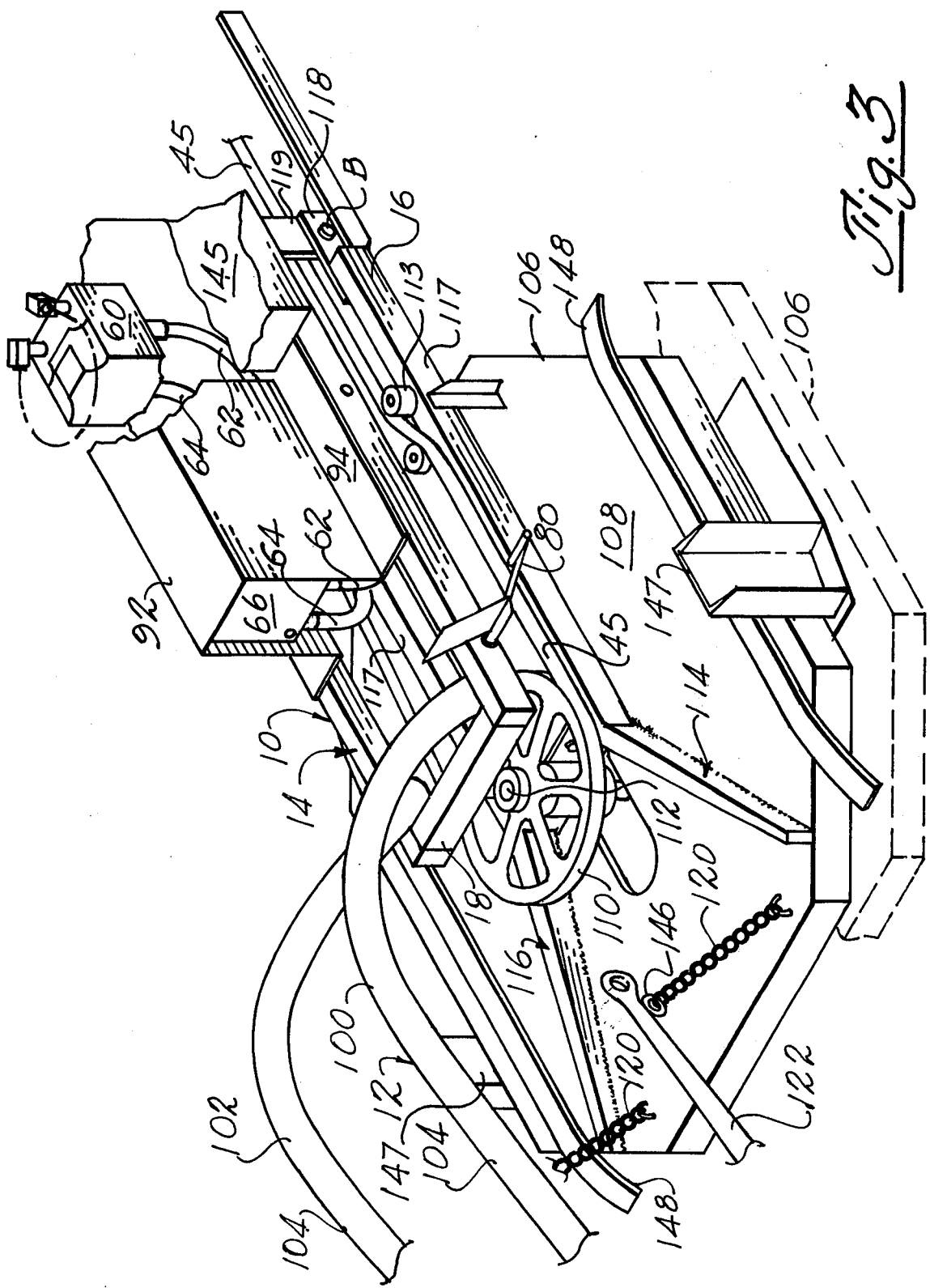
FIG. 3 is a perspective view of the front frame portion of the tractor showing a detachable mower implement mounted thereon and illustrating how the implement may be detached or attached by driving thereover.

Frame 12 comprises a pair of spaced, tubular curved frame members 100, 102 having a substantially straight portion 104 at the forward ends and together providing a space beneath the front portion of the tractor frame 12 to accommodate one of many different types of conventional agricultural implements such as a mower implement 106 shown in FIG. 3 which comprises a housing 108 in which there is a rotating mower blade or blades (not shown) rotatably operated from an upper pulley 110 attached to a center drive shaft 112 extending through housing 108. The belt 45 extends in continuous fashion thru pulley guide wheels 113 about the pulley 110 and drives same from the output power take-off pulley 44 on the engine 28. Housing 108 is supported by means of a pair of off-set frame members 114, 116 having rearwardly extending members 117 provided with attachment plates 118 removably bolted to a plate 119 depending from respective frame members 16 by means of bolts B.

The mower attachment is retained in place and controlled at the front thereof by means of chains 120 which are attached to implement control arm members 122, 124 each having one forward end extending beneath a cross frame member 126 and pivotally attached to a plate member 125 on chassis 12. Implement control members are pivotally shifted by means of a compound lever system comprising respective connecting levers 128, 128' shifted by means of respective levers 130, 132 joined and moved at terminal ends by a control rod 134 mounted in opposed plates 135. A push-pull cylinder assembly 136 having a rod 137, is attached to the front end of tractor frame 12 on a plate 138 secured between a U-shaped frame 140 having the ends welded to the cross member 126. The cylinder assembly and rod 137 is driven by an electric motor-transmission unit 141. The cylinder 136 cylinder rod 137 is attached to the control rod 134 by means of a pivoted shifting lever 142 having an upper projecting portion 143 on which is attached one end of a coil spring 144 having the other end attached to the cylinder assembly 136. An electrical wire extends back to a battery 145 and there is a hand control for operating the unit 141 located near the operator. Chains 120 are hooked to metal eyelets 146 on each arm member 122, 124" (see FIG. 3) after the tractor is driven in place and bolts B inserted. Implement 106 has a pair of curved steel guide bars 148 welded thereto and centering plates 147 thereon for assistance in locating the implement. Thus, after the implement is in place the unit 141 is operated to raise or lower same by moving arms 122, 124 and chains 120. Spring 144 may be omitted.

The steering device for the pair of small front wheels 150 comprises individual support sleeves 152, 154 having the upper end welded to the cross member 126 and supporting therein a steering kingpin 156 which has the lower end attached to the axle 158 of each wheel 150 and has the upper end attached to a steering control link 160. Each respective end of the steering control members 160 is joined by a pivoted rod 162, 164 which is attached at a common point on the pivoted steering arm 168 mounted on a conventional steering box 170 having means thereon for translating rotary motion to move arm 168 from a steering shaft 172 extending therefrom. Steering shaft 174 extends into the steering box 170 and through the conventional steering gear arrangement therein rotates the output shaft 172 in one direction or the other to move the steering rods 162, 164 and thereby shift the steering links 160 in one direction or the other to move the front wheels 150 according to the movement of a steering wheel 180 attached to the steering rod 174 which is supported on a post 182 in a bearing 184 therein.

While I have shown and described a particular embodiment of this invention together with suggested mode of operation thereof, this is by way of illustration only and does not constitute any sort of limitation on the invention since various alterations, changes, deviations, eliminations, additions, revisions, modifications and departures may be made in the embodiment shown without departing from the scope of this invention as defined only by a proper interpretation of the appended claims.

What is claimed:

1. In a tractor, an elongated tractor frame, driving wheels mounted on the rear portion of said frame and front wheels steerably mounted on the forward portion of said frame, means for steering said front wheels, an engine mounted on the rear portion of said frame for driving said rear wheels, an operator's seat mounted on said frame positioned forwardly of said engine, an implement space defined by said frame behind said front steerable wheels and in front of said seat, and means for supporting an implement in said implement space comprising a pair of implement support arms each pivotally mounted at its forward end on said frame in front of said implement space and extending rearwardly toward said implement space for supporting an implement in said implement space, a lever system for pivoting said implement support arms upwardly and downwardly about their forward ends comprising a pair of connecting arms each connected at one of its ends to an intermediate portion of one of said implement support arms, a control rod extending across the length of said frame and supported at its ends on said frame and including levers extending rearwardly therefrom and connected to said connecting rods, a pivoted shifting lever mounted on said control rod and arranged to pivot said levers about said control rod, and power operated means mounted on said frame and arranged to pivot said pivoted shifting lever, whereby the power operated means actuates the lever system to cause said implement support arms to pivot upwardly and downwardly about their forward ends and raise and lower the implement carried thereby.

2. The device in claim 1 and further including a transmission connected to said engine, a differential driven by said transmission, a pair of upper axle drive shafts extending from said transmission on each respective side thereof and having a pinion thereon, a short axle on each respective rear wheel located below said pinion, and a large gear connected to said shaft on each wheel and being driven by a respective pinion.

3. The apparatus of claim 1 and wherein said power operated means comprises a push-pull cylinder assembly.

4. The apparatus of claim 1 and wherein said engine includes a power take-off pulley, guide pulleys at the rear of said tractor below said power take-off pulley, and a drive belt extending about and downwardly from said power take-off pulley around said guide pulleys and forwardly toward said implement space to drive the implement in said implement space.

5. In a tractor, an elongated tractor frame including driving wheels mounted on the rear portion thereof and front wheels steerably mounted on the front portion thereof, means for steering said front wheels, an engine mounted on the rear portion of said tractor frame in driving connection with said driving wheels and including a power take-off pulley, a seat mounted on said frame forwardly of said engine, a forward implement space defined by said frame positioned forwardly of said seat and rearwardly of said front wheels, means for supporting an implement in said implement space comprising support members, and means for controlling said support members, a guide pulley arrangement on the rear of said tractor beneath said power take-off pulley, a drive belt extending about and downwardly from said power take-off pulley and around said guide pulley arrangement and forwardly from said guide pulley arrangement toward said implement space for connection to an implement supported by said support members in said implement space.

6. In a tractor, an elongated tractor frame, opposed spaced large rear wheels mounted on opposite sides of the rear of said frame and smaller opposed front wheels steerably mounted on the front of said frame, an engine mounted on the rear portion of said frame and in driving connection with said rear wheels, a tractor seat mounted on said frame forwardly of said engine, said frame defining forwardly of said seat and rearwardly of said front wheels an implement space in which an implement can be mounted, a pair of implement support arms each pivotally mounted at one end on the forward portion of said frame and extending rearwardly toward said implement space, a pair of first connecting links each pivotally connected at one end to each of said control arms and extending upwardly thereform, a pair of second connecting links each connected at one end to each of said first links and extending forwardly therefrom, a control rod extending transversely across said frame and attached to the forward portion of both of said second connecting links, means on said frame for simultaneously pivoting both of said second connecting links about said rod to raise and lower said first and second links and to pivot said implement support arms upwardly and downwardly about their forward ends to raise and lower the implement in the implement space, and power means on said frame for operating said means for pivoting said second connecting links about said control rod.

7. The tractor of claim 6 and wherein said power means comprises a push-pull cylinder assembly connected at one end to the forward portion of said frame and including a rod extending rearwardly therefrom and connected at its end to said means for simultaneously pivoting both of said second connecting links about said control rod whereby said implement can be urged upwardly and downwardly in the implement space.

8. The tractor of claim 6 and wherein said implement support arms are pivotally supported on said frame forwardly of said control rod.

9. A tractor comprising a frame, a pair of steerable wheels mounted on the forward portion of said frame and a pair of driving wheels mounted on the rear portion of said frame, an engine mounted on the rear portion of said frame in driving connection with said driving wheels, said frame defining forwardly of said engine and rearwardly of said steerable wheels an implement space in which an implement can be mounted, a pair of implement support arms each pivotally connected at one end to the forward portion of said frame and extending rearwardly toward the implement space, a lever system mounted on said frame at a position located above said implement support arms and rearwardly from the connection to said frame of said implement support arms and connected to said implement support arms intermediate their ends, and a push-pull cylinder assembly mounted on said frame and connected to said lever system for urging said implement support arms and the implement carried thereby upwardly or downwardly away from or toward engagement with the ground beneath the tractor.

10. The tractor of claim 9 and wherein said lever system comprises a pair of first upwardly extending connecting links each connected at its lower end to an implement support arm, a pair of second forwardly extending connecting links each connected at its rear end to the upper end of one of said first connecting links, a control rod extending transversely of the length of said frame, said pair of second connecting links each connected at their forward ends to and pivotal about the longitudinal axis of said control rod, and means for pivoting said second connecting links about said control rod.

11. The tractor claimed in claim 9 and wherein said opposed arms are supported respectively on opposite sides of said frame, and there are means for attaching each arm detachably to opposite sides of said implement.

12. In a tractor: an elongated tractor frame having opposed, spaced large rear wheels mounted on opposite sides of the rear thereof and smaller, opposed front wheels steerably mounted on the front thereof, said frame comprising a rear rectangular portion having horizontal frame members and transverse frame members, a drop axle drive assembly for each of said rear wheels comprising an output shaft mounted on said frame, individual shafts for each wheel mounted below said output shaft, and gear means connecting said output shaft with said individual shafts, an engine on said frame, a hydraulic pump, hydraulic motor operated by said pump, means connecting said engine with said hydraulic pump, control means for said pump, a differential on said frame connected with said output shaft, a tractor seat mounted forwardly of said engine, a battery on said tractor, said tractor frame defining between the seat and the forward end a space in which an implement may be mounted, means on opposite sides of said frame for connecting the rearward portion of an implement detachably and attachably thereto, means on opposite sides of the forward end of said tractor beneath the frame for attaching opposite sides of the front of an implement thereto and comprising movable control arms pivotally mounted on said frame, a pair of respective links and there being one for each of said control arms pivotally attached thereto, a second link attached to each of said first links, a control rod extending transversely across said frame and attached to each of said second links and means on said frame for rotating said arm to move said first and second links to operate said control arms to move said implement, and power means on said frame for operating said means for rotating said rod.

* * * * *